United States Patent [19]

Fougner

[11] 3,997,413
[45] Dec. 14, 1976

[54] PURIFICATION OF MAGNESIUM CHLORIDE CELL BATH MATERIAL USEFUL FOR THE PRODUCTION OF MAGNESIUM METAL BY ELECTROLYSIS

[76] Inventor: Sven Fougner, 110 10th St., Garden City, N.Y. 11530

[22] Filed: Oct. 23, 1975

[21] Appl. No.: 625,078

[52] U.S. Cl. .................................. 204/70; 423/155
[51] Int. Cl.² ...................... C25C 3/04; C01F 1/00
[58] Field of Search ............ 204/70; 423/155, 497, 423/498, 178

[56] References Cited
UNITED STATES PATENTS 2,375,009   5/1945   Lepsoe et al. ...................... 204/70

*Primary Examiner*—John H. Mack
*Assistant Examiner*—H. A. Feeley
*Attorney, Agent, or Firm*—Cooper, Dunham, Clark, Griffin & Moran

[57] ABSTRACT

Magnesium chloride-containing material for use in the electrolytic cell for the production of elemental magnesium is melted and contacted with vaporized magnesium metal, preferably by direct injection of the vaporized magnesium metal into a body or pool of the molten magnesium chloride-containing material under conditions of vigorous agitation. The resulting treated molten magnesium chloride-containing material, after settling and separation of sludge and impurities therefrom, is introduced into an electrolytic cell for the production of elemental magnesium.

20 Claims, 1 Drawing Figure

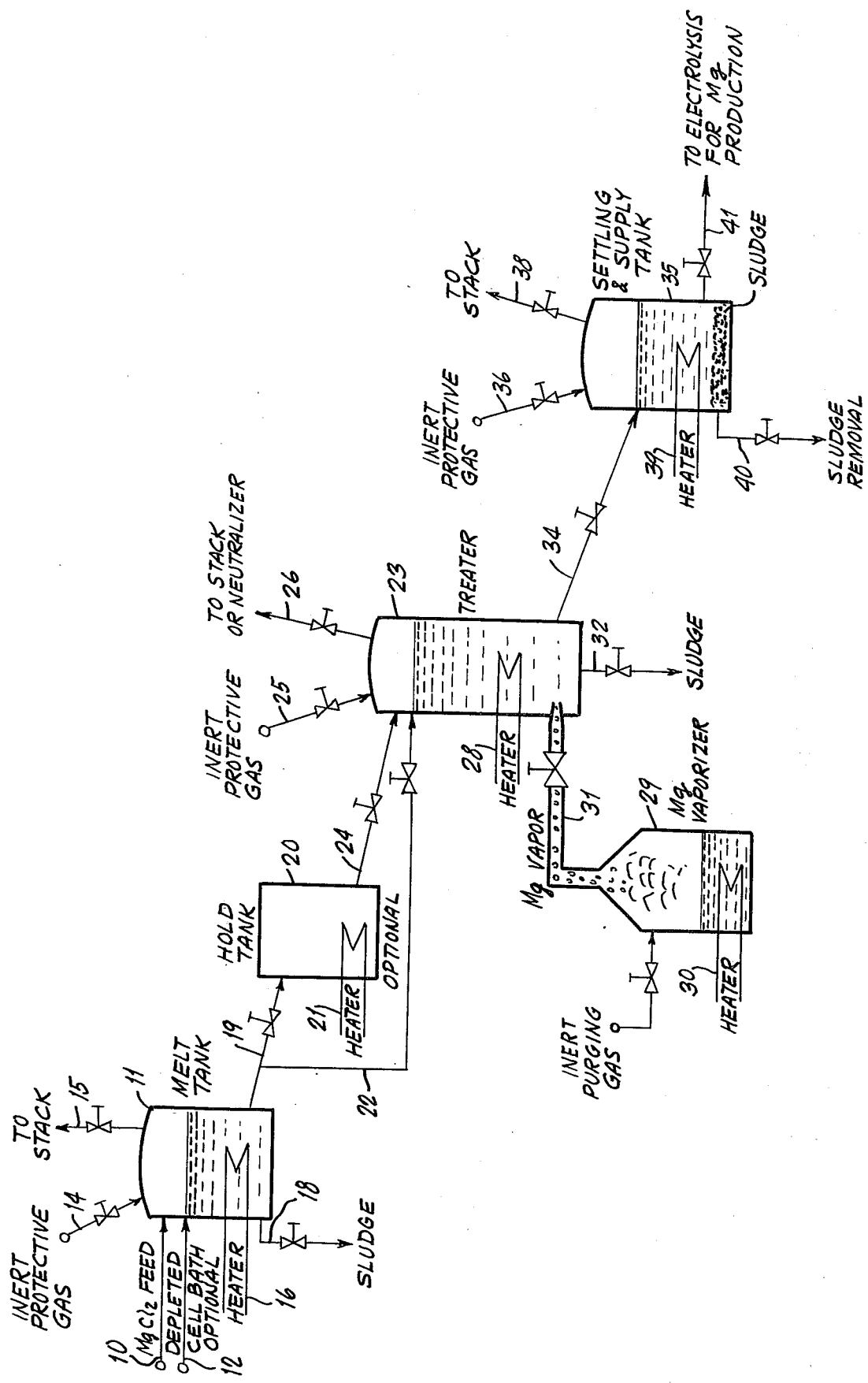

PURIFICATION OF MAGNESIUM CHLORIDE CELL BATH MATERIAL USEFUL FOR THE PRODUCTION OF MAGNESIUM METAL BY ELECTROLYSIS

This invention relates to the electrolytic production of elemental magnesium. More particularly, this invention relates to the production of elemental magnesium by the electrolytic dissociation of molten magnesium chloride.

In one embodiment this invention is directed to a method of treating molten magnesium chloride or molten magnesium chloride-containing material for use in an electrolytic cell for the production of elemental magnesium so as to improve the quality of the magnesium chloride or magnesium chloride-containing material by removing impurities therefrom prior to employing the treated magnesium chloride-containing material in an electrolytic cell for the production of elemental magnesium.

In another embodiment this invention is directed to an apparatus and/or system for the purification of magnesium chloride or magnesium chloride-containing material prior to employing the resulting treated magnesium chloride in an electrolytic cell for the manufacture of elemental magnesium.

The production of elemental magnesium by the electrolytic dissociation of magnesium chloride is well known and many techniques have been employed for carrying out the electrolytic dissociation of magnesium chloride in an electrolytic cell for the production of elemental magnesium and for the treatment of the magnesium chloride cell bath material during the production of elemental magnesium and for the treatment of magnesium chloride and magnesium chloride cell bath material for the removal of impurities therefrom prior to the introduction of the resulting treated magnesium chloride-containing material into the electrolytic cell for the manufacture of elemental magnesium therein, see U.S. Pats. No. 1,820,022, 2,375,009, 2,888,389, 3,389,062, 3,607,017, 3,661,737 and 3,661,738. The disclosures of the above-identified patents are herein incorporated and made part of this disclosure.

It has been recognized that magnesium chloride intended for use for the electrolytic production of magnesium metal should be of fairly high purity. In the above-referred U.S. Pat. No. 2,375,009 it is disclosed that magnesium chloride for use in the electrolytic production of elemental magnesium should preferably contain no water and a total of not more than about 1% solid impurities, such as carbon, silica, magnesium oxide, and soluble impurities, such as iron and aluminum in chloride form, iron and aluminum being below magnesium in the electromotive series. Thus, according to U.S. Pat. No. 2,375,009, magnesium chloride or magnesium chloride-containing material containing not more than 1% impurities permits the recovery of magnesium metal in the order of 90% of the magnesium with high current efficiency. The presence of a larger amount of impurities, about 2%, results in a lower production and recovery of magnesium, about 80%, and the presence of about 4% by weight impurities results in a still lower percentage recovery of magnesium, about 60%. According to U.S. Pat. No. 2,375,009, lower recoveries of electrolytic elemental magnesium metal from a magnesium chloride-containing cell bath having impurities greater than 1–2% are due to the retention of electrolyte and of metallic magnesium by magnesium oxide and other insoluble impurities which form mud in the electrolytic cell and which must be removed by the cell. The importance of providing a clean magnesium chloride cell bath material during the operation of an electrolytic cell for the manufacture of elemental magnesium is indicated by N. Höy-Petersen in an article appearing in J. of Metals, April 1969, wherein this author states:

"The cell feed must not contain more than 0.2% C, 0.001% B, 0.2% MgO, 0.1% $H_2O$, 0.05% $SO_3$, 0.04% Fe, 0.005% Ti and 0.1% $MnCl_2$. The effect of boron alone is of the order of 1% current efficiency reduction per 10 ppm B".

In view of the effect of even small amounts of impurities on the efficiency of the cell for the production of elemental magnesium, as evidenced by the above-cited patents and article, various techniques have been employed to improve the operation of the cell and to improve or purify the cell bath material for the electrolytic production of magnesium from magnesium chloride. U.S. Pat. No. 2,375,009 discloses taking mud or sludge from the electrolytic cell, the mud containing up to about 10% metallic magnesium together with varying percentages of magnesium oxide, silica, carbon, iron and aluminum and entrained chloride electrolyte and adding the mud to the magnesium chloride cell bath material in a purification step prior to utilizing the magnesium chloride cell bath material in the electrolytic cell. According to U.S. Pat. No. 2,375,009, the metallic magnesium in the mud, when employed in this purification operation, is effective in replacing from their respective chlorides the metallic impurities, such as iron and aluminum, which are present in the magnesium chloride cell bath material as impurities and which are below or lower than magnesium in the electromotive series. For the most part, however, the various techniques and apparatus and improvements suggested for the operation of a cell for the manufacture of magnesium and/or for the treatment of magnesium chloride-containing cell bath material prior to use in an electrolytic cell for the manufacture of elemental magnesium have not been completely successful.

Accordingly, it is an object of this invention to provide an improved method of purifying magnesium chloride-containing material prior to its use in an electrolytic cell for the manufacture of elemental magnesium.

It is another object of this invention to provide an apparatus or system for the purification of magnesium chloride-containing material prior to the introduction or utilization of the magnesium chloride material for the production of elemental magnesium.

How these and other objects of this invention are achieved will become apparent from the accompanying disclosure and drawing wherein there is schematically illustrated a flow scheme and apparatus embodying the practices of this invention for the treatment of magnesium chloride-containing material prior to the utilization of the resulting treated magnesium chloride material in an electrolytic cell for the manufacture of elemental magnesium.

In accordance with this invention molten magnesium chloride-containing material before use in an electrolytic cell for the production of elemental magnesium is contacted with vaporized magnesium metal under conditions such that as the vaporized magnesium metal is brought into contact with the molten magnesium chloride-containing material, the vaporized magnesium metal condenses thereon. Thereupon, the resulting treated molten magnesium chloride-containing material, now containing the vaporized magnesium metal condensed therein, is passed to a settler or settling zone for the settling, accumulation and removal of sludge and impurities. The resulting treated molten magnesium chloride-containing material is then supplied, preferably directly, to an electrolytic cell for the electrolytic production of magnesium metal therefrom.

In the practice of this invention it is preferred that the vaporized magnesium metal is brought into contact with the molten magnesium chloride-containing material under conditions such that not only is the vaporized magnesium metal condensed upon contact with the molten magnesium chloride-containing material but the contact between the vaporized magnesium metal and the molten magnesium chloride-containing material is effected under conditions of vigorous agitation.

Various techniques are suitably employed for effecting contact between the vaporized magnesium metal and the molten magnesium chloride-containing material. It is preferred in the practice of this invention to inject the vaporized magnesium metal directly into a body or pool, preferably at the lower portion thereof, of the molten magnesium chloride-containing material under conditions to effect vigorous agitation or mixing of the molten magnesium chloride-containing material and contact therewith of the injected or introduced vaporized magnesium metal. In one special embodiment of the practice of this invention the vaporized magnesium metal is introduced tangentially into the lower portion of a cylindrical pool or body of molten magnesium chloride-containing material.

As indicated hereinabove, various techniques may be employed for effecting contact between the vaporized magnesium and the molten magnesium chloride-containing material to be purified before being employed in an electrolytic cell for the manufacture of magnesium. Techniques suitably employed include introducing vaporized magnesium metal into contact with a body of molten magnesium chloride-containing material which is at the same time vigorously agitated. Another technique suitable for the practice of this invention would involve introducing the vaporized magnesium metal into contact with a spray or droplets of molten magnesium chloride-containing material. In general, it is desirable in the practice of this invention to effect intimate, rapid and thorough contact between the vaporized magnesium metal and the molten magnesium chloride-containing material. Any system or apparatus useful for effecting gas-liquid contact, i.e. effecting contact between gaseous or vaporized magnesium metal and liquid molten magnesium chloride-containing material, is suitably employed in the practice of this invention. As indicated hereinabove, however, it is preferred to effect contact between vaporized magnesium metal and the molten magnesium chloride-containing material by direct, desirably tangential, injection of the vaporized molten metal into the lower portion of a body of molten magnesium chloride-containing material.

As indicated hereinabove, the contact between the vaporized magnesium metal and the molten magnesium chloride-containing material is effected under conditions such that the vaporized magnesium metal condenses within and/or upon contact with the molten magnesium chloride-containing material. Substantially pure magnesium chloride has a melting point of about 712° C. and has a boiling point of about 1412° C. at atmospheric pressure. Magnesium metal has an atmospheric boiling point of about 1107° C. Accordingly, in the practice of this invention, and in the instance wherein contact between the vaporized magnesium metal and molten magnesium chloride-containing material is carried out under ambient pressure, the vaporized magnesium metal brought into contact with the molten magnesium chloride would have a temperature of at least about 1107° C. Also, in this particular embodiment of the practice of the invention, i.e. assuming the contacting operation is carried out at ambient pressure, the magnesium chloride-containing material would be at a temperature of at least, preferably slightly above, its melting point, e.g. at least about 712° C., if industrial, substantially anhydrous magnesium chloride is employed.

As would be apparent from the above in the practice of this invention, the temperature of the vaporized magnesium metal employed in the practice of this invention may have a temperature above about 1107° C., such as a temperature in the range from about 1150° C. up to about 1400° C., usually in the range 1175° C.–1275° C.

The temperature of the magnesium chloride-containing material employed in the practice of this invention may have a suitable temperature in the range from the melting point of the magnesium chloride-containing material which might be slightly higher or lower than the melting point of substantially pure magnesium chloride (712° C.), such as a temperature in the range from about 715° C. to about 900-1050° C., but below the atmospheric boiling point of magnesium metal, 1107° C.

Some control of the temperature of the contacting operation and the temperature of the vaporized metal and the molten magnesium chloride-containing material in the practice of this invention is possible by carrying out the operations generating the vaporized magnesium metal and carrying out the contacting operation between the vaporized magnesium metal and the molten magnesium chloride-containing material at pressures greater or less than the ambient atmospheric pressure, such as by carrying out the contacting operation at a subatmospheric pressure in the range about 0.1–0.9 atmosphere or at a superatmospheric pressure, such as in the range 1.5–10 atmospheres pressure absolute, more or less.

In the contacting operation it is desirable that there be maintained a temperature differential between vaporized magnesium metal and the molten or liquid magnesium chloride-containing material, such that condensation of the vaporized magnesium metal occurs promptly, substantially instantaneously, upon contact with the molten magnesium chloride-containing material. Desirably, the contacting operation is carried out under temperature conditions such that the temperature differential between the vaporized magnesium metal and the molten magnesium chloride-containing material is maximized, desirably under conditions such that the aforementioned temperature differential is in the range from about 20° C. to about 400° C., more or less.

As indicated hereinabove, the practices of this invention are applicable to the treatment of industrial, substantially anhydrous magnesium chloride for purification prior to employing in an electrolytic cell for the manufacture of electrolytic elemental magnesium or magnesium metal. Although industrially produced anhydrous magnesium chloride is of substantial purity, before such magnesium chloride is employed as cell bath material in an electrolytic cell for the manufacture of magnesium, it is desirable in accordance with the practices of this invention to treat such magnesium chloride material by contact with vaporized magnesium metal.

Magnesium chloride-containing material suitable for use as electrolytic cell bath for the electrolytic manufacture of magnesium need not be substantially only magnesium chloride. The magnesium chloride-containing material improved by the practices of this invention for eventual use as cell bath material for the manufacture of elemental magnesium usually contains a major amount of magnesium chloride. Other materials present in the magnesium chloride-containing material usefully treated in accordance with the practices of this invention might include such materials as diluent or ballast salts. Such salts are usually found in minor amount in industrial dehydrated or substantially anhydrous magnesium chloride and include the alkali metal chlorides, such as potassium chloride, sodium chloride and lithium chloride. Other materials might also be present in the magnesium chloride-containing material being treated in accordance with this invention, such as depleted magnesium cell bath material sometimes referred to in the trade as "dippings". Depleted cell bath material is usually removed from time to time from the electrolytic cell during magnesium production. The use of molten depleted cell bath material, usually in a minor or major amount admixed with the industrial, substantially anhydrous magnesium chloride for treatment in accordance with this invention, is advantageous since the heat in the molten cell bath material is recovered and employed to melt the magnesium chloride prior to contact with vaporized magnesium in accordance with this invention. The use of hot molten cell bath material for admixture with industrial, substantially anhydrous magnesium chloride is useful not only for heat economy but also the use of such material serves to ultimately dry the magnesium chloride and reduce the loss of magnesium chloride due to reaction or hydrolysis with water which might be present and which might react with the magnesium chloride to produce MgO and hydrochloric acid or Mg(OH)Cl. In any event the treatment of magnesium chloride-containing material in accordance with this invention, as indicated hereinabove, is not limited to the treatment of a melt consisting substantially only of magnesium chloride with minor amounts of alkali metal chlorides but is also applicable to any magnesium chloride containing salt mixtures intended for feed to a magnesium electrolytic cell.

In the practices of this invention contact between the vaporized magnesium metal and the molten magnesium chloride-containing material is effected for a suitable period of time, such as in the range 0.5 minute to about 10 minutes, usually for a fairly short period of time in the range 1–5 minutes, before the resulting contacted magnesium chloride-containing material is withdrawn for settling and removal of any deposited sludge or impurities. The amount of vaporized magnesium relative to the magnesium chloride-containing material employed in the practices of this invention is usually about 0.5–2% by weight of the magnesium content of the molten magnesium chloride-containing material undergoing treatment, such as about 1%. For example, in the practices of this invention one can employ an amount of vaporized magnesium metal equivalent to about 1% of the magnesium content of the molten magnesium chloride-containing material undergoing treatment by contact with the vaporized magnesium metal, up to 4–5 pounds of vaporized magnesium metal would be employed to contact and treat and purify about 2000–2200 pounds of a melt containing about 85% by weight magnesium chloride.

Reference is now made to the accompanying drawing which schematically illustrates a flow scheme and apparatus embodying the practices of this invention for the treatment of magnesium chloride-containing material prior to the utilization of the resulting treated magnesium chloride material in an electrolytic cell for the manufacture of elemental magnesium. In the practices of this invention as illustrated in the drawing, magnesium chloride-containing material, such as industrial grade, substantially anhydrous magnesium chloride, is supplied from a suitable source, not shown, via line 10 into melt tank 11. If desired, additional materials, such as depleted cell bath material, are optionally added to melt tank 11 from a suitable source, not shown, via line 12. An inert gas, such as nitrogen or argon or the like, to provide a protective atmosphere within melt tank 11 is supplied from a suitable source, not shown, via valved line 14 and vent line 15 is shown associated or connected to melt tank 11 for venting gases for disposal or recycle.

Melt tank 11 is provided with heating means or heater 16 for melting the contents therein and a valved draw-off line 18 is provided in communication with the bottom of melt tank 11 for the withdrawal or removal of any sludge which tends to accumulate in the bottom of melt tank 11.

After the solids material, such as solid magnesium chloride introduced into melt tank 11 via line 10, has been melted, the resulting molten mixture is withdrawn from melt tank 11 via valved line 19 into hold tank 20 which is provided with heating means 21 for maintaining the contents of hold tank 20 in the molten state prior to further treatment in accordance with this invention. The use of hold tank 20 is optional, as indicated. Preferably, molten material from melt tank 11 is withdrawn via valved line 22 and supplied directly to treater 23, as would be the contents of hold tank 20, when desired, via valved line 24.

Within treater 23 the molten magnesium chloride-containing material is treated or contacted with vaporized magnesium. As indicated, an inert protective gas is provided within treater 23 via valved line 25 and any gases are vented via valved line 26 for disposal or recycle. Treater 23 is provided with heating means or heater 28 to maintain molten at the desired temperature the molten magnesium chloride material introduced into treater 23 via valved line 22 and/or valved line 24.

Magnesium vapor employed to treat the molten magnesium chloride-containing material within treater 23 is generated within magnesium vaporizer 29 wherein magnesium metal is heated and vaporized by heater 30. The resulting vaporized magnesium or magnesium vapor is supplied from vaporizer 29 via valved line 31, preferably tangentially, into the bottom of treater 23, as illustrated, for direct contact with the molten magnesium chloride-containing material therein. From time to time, if desired, introduction of vaporized magnesium via line 31 into treater 23 can be interrupted and any sludge which might build up within the bottom of treater 23 can be withdrawn via valved line 32.

Contact between the molten magnesium chloride-containing material within treater 23 with vaporized magnesium introduced thereinto via line B1 is carried out for an effective period of time, usually in the range about 0.5–10 minutes, e.g. 1–2 minutes, to effect purification of the magnesium chloride material within treater 23, such as by displacement of those metals, usually in the chloride form, within the magnesium chloride-containing material which have a position in the electromotive series lower than that of magnesium, such as iron and aluminum. Other impurities present in the magnesium chloride material within treater 23 are also removed or conditioned for removal by treatment with the magnesium vapor.

After treatment of the molten magnesium chloride-containing material within treater 23, the resulting treated magnesium chloride-containing material is removed therefrom via valved line 34 for transfer into settling and supply tank 35 which is provided with an inert atmosphere via valved line 36 and from which gases can be removed when desired via valved line 38. Settling and supply tank 35 is provided with heater 39 for maintaining the magnesium chloride-containing material therein molten and at the desired temperature. After a suitable settling period or period of quiescence within settling or supply tank 35, impurities tend to collect at the bottom of settling or supply tank 35 as a sludge and this sludge is removed via valved line 40. The resulting purified magnesium chloride-containing material, after settling of the impurities therefrom as sludge, is removed from settling or supply tank 35 via valved line 41 for use as cell bath material in an electrolytic cell for the manufacture of elemental magnesium or magnesium metal.

As would be indicated, the operations illustrated in the drawing of melting, treating magnesium metal, vaporization and settling may be carried out batchwise and/or intermittently and, if desired, continuously.

The following example is illustrative of the practices of this invention.

2,200 pounds of an admixture of commercial, substantially anhydrous magnesium chloride and spent magnesium cell bath material, the admixture analyzing about 85% magnesium chloride, equivalent to about 450 pounds magnesium metal, is melted and maintained in a treater at a temperature of about 750° C. 4 to 5 pounds of magnesium metal are heated, melted and vaporized and the resulting vaporized magnesium metal introduced into the molten magnesium chloride material within the treater over a period of about 5 minutes. The resulting treated magnesium chloride material, now containing condensed magnesium metal therein, is removed and passed to a settling tank and permitted to be quiescent and to settle over a period of about 10–60 minutes, more or less, for the settling of sludge and other particle-form impurities. The resulting settled sludge and particle-form impurities are withdrawn from the bottom of the settling tank and the substantially impurity-free magnesium chloride material still in molten condition is removed and supplied as feed to electrolytic cells for the manufacture of magnesium metal.

In the practices of this invention utilizing vaporized magnesium chloride as the purifying agent for the magnesium chloride-containing material before it is employed in an electrolytic cell for the manufacture of magnesium, advantages are obtainable, particularly when compared with the prior art techniques, such as U.S. Pat. No. 2,375,009, since the purifying agent, vaporized magnesium metal, is substantially pure and does not introduce or recirculate impurities within the magnesium chloride-containing material undergoing treatment. Specifically, in the prior art as embodied in U.S. Pat. No. 2,375,009, sludge or cell mud containing liquid magnesium metal together with impurities is employed to scavenge or treat the magnesium chloride-containing material before it is employed in an electrolytic cell for the manufacture of magnesium. This technique requires an expenditure of considerable effort to finely and uniformly distribute the molten magnesium metal contained within the mud with the molten magnesium chloride during the treating operation. Additionally, the mud contains impurities which are recirculated and redistributed within the magnesium chloride-containing material and which must then be removed by settling. It would appear, therefore, that the prior art technique of U.S. Pat. No. 2,375,009 is self-defeating with respect to the purification of the magnesium chloride-containing material.

In contrast, in the practice of this invention substantially pure magnesium metal is employed and this magnesium metal is not introduced into the magnesium chloride-containing material in liquid form but rather in the vapor form. Introduction of liquid magnesium metal would require intensive agitation for uniform distribution of the magnesium metal within the magnesium chloride-containing material undergoing treatment. By employing vaporized magnesium metal in accordance with this invention, not only is a substantially pure and uniform treating agent utilized but the distribution of the treating agent is greatly facilitated since it is introduced into the magnesium chloride-containing material in vapor form or in atomic form. Condensation of the thus-introduced magnesium metal occurs rapidly within the magnesium chloride-containing material undergoing treatment and the resulting condensed magnesium metal is in very fine, substantially colloidal, particle size, approaching atomic or molecular magnesium, and of much finer particle size than would be possible if molten magnesium metal were introduced into the magnesium chloride-containing bath. All these advantages are achieved with a minimum expenditure of energy. The resulting treated magnesium chloride-containing material is thereby treated and conditioned by, in effect, loading the bath with dissolved or molten magnesium. The treated magnesium chloride is transferred in this condition in accordance with the practices of this invention directly into the electrolytic cell in what might be called a primed condition for the electrolytic production of elemental magnesium or magnesium metal.

As will be apparent to those skilled in the art in the light of the foregoing disclosures, many modifications, alterations and substitutions are possible in the practice of this invention without departing from the spirit or scope thereof.

I claim:

1. A method of treating magnesium chloride-containing material for use in an electrolytic cell for the production of elemental magnesium which comprises melting said magnesium chloride-containing material, introducing vaporized magnesium metal into contact with the resulting molten magnesium chloride-containing material under conditions to effect condensation of the vaporized magnesium metal and withdrawing the resulting treated molten magnesium chloride-containing material, said treated molten magnesium chloride-containing material after having been withdrawn and passed to a settling tank, is settled and any sludge or impurities settling out or separating therefrom are withdrawn from the bottom of the settling tank to produce a substantially impurity free magnesium chloride material.

2. A method in accordance with claim 1 wherein the resulting treated and withdrawn molten magnesium chloride-containing material is subjected to electrolysis for the production of elemental magnesium.

3. A method in accordance with claim 1 wherein said magnesium chloride-containing material comprises a major amount of magnesium chloride.

4. A method in accordance with claim 1 wherein said magnesium chloride-containing material comprises a minor amount of magnesium chloride.

5. A method in accordance with claim 1 wherein said magnesium chloride-containing material contains used magnesium cell bath material.

6. A method in accordance with claim 1 wherein said magnesium chloride-containing material comprises a minor amount of magnesium chloride and a major amount of alkali metal and/or alkaline earth metal chlorides.

7. A method in accordance with claim 1 wherein said magnesium chloride-containing material comprises at least about 95% by weight magnesium chloride.

8. A method in accordance with claim 1 wherein said magnesium chloride-containing material consists essentially of magnesium chloride and not more than about 5% by weight impurities.

9. A method in accordance with claim 1 wherein said molten magnesium chloride-containing material into which said vaporized magnesium metal is introduced into contact is maintained at a temperature below about 1100° C.

10. A method in accordance with claim 1 wherein said molten magnesium chloride-containing material into which said vaporized magnesium metal is introduced into contact is maintained at a temperature in the range from about 715° C. up to about 900° C.

11. A method in accordance with claim 1 wherein the temperature of said molten magnesium chloride-containing material is maintained at a temperature in the range from about 20° C. to about 400° C. below the temperature of the vaporized magnesium metal introduced into contact therewith.

12. A method in accordance with claim 1 wherein said vaporized magnesium metal is brought into contact with the molten magnesium chloride-containing material under conditions wherein the molten magnesium chloride-containing material is agitated.

13. A method in accordance with Claim 1 wherein said vaporized magnesium metal is brought into contact with a pool or body of said molten magnesium chloride-containing material.

14. A method in accordance with claim 13 wherein said vaporized magnesium metal is directly introduced into said pool or body of molten magnesium chloride-containing material under conditions such that said pool or body of molten magnesium chloride-containing material is agitated.

15. A method in accordance with claim 1 wherein said vaporized magnesium metal is brought into contact with a spray or droplets of said molten magnesium chloride-containing material.

16. A method in accordance with claim 1 wherein said vaporized magnesium metal is brought into contact with said molten magnesium chloride-containing material in a gaseous environment wherein said gaseous environment is inert with respect to said vaporized magnesium metal and said molten magnesium chloride-containing material.

17. A method in accordance with claim 1 wherein an amount of vaporized magnesium metal equivalent to about 0.1–2.0% by weight of the elemental magnesium content of the molten magnesium chloride-containing material undergoing treatment is employed to contact said molten magnesium chloride-containing material.

18. A method in accordance with claim 1 wherein said contact between said vaporized magnesium metal and said molten magnesium chloride-containing material is carried out over a period of time in the range of about 0.5 minute to about 10 minutes.

19. A method in accordance with claim 1 wherein said operations of introducing vaporized metal into contact with molten magnesium chloride-containing material and the withdrawal of the resulting treated molten magnesium chloride-containing material are carried out substantially continuously and substantially simultaneously.

20. A method in accordance with claim 1 wherein said operations of melting said magnesium chloride-containing material, introducing vaporized magnesium metal into contact with said molten magnesium chloride-containing material and the withdrawal of the resulting treated molten magnesium chloride-containing material are carried out intermittently or batchwise.

* * * * *